May 28, 1957  W. H. V. CLARKE  2,793,669
CONTAINER
Filed Feb. 28, 1955  2 Sheets-Sheet 1

Inventor
W. H. V. CLARKE
By
Wenderoth, Lind & Ponack
Attorneys

May 28, 1957 W. H. V. CLARKE 2,793,669
CONTAINER
Filed Feb. 28, 1955 2 Sheets-Sheet 2
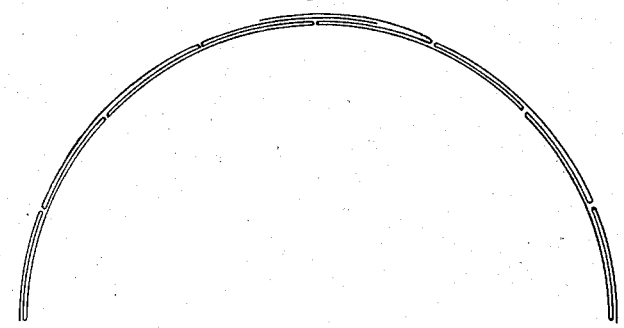
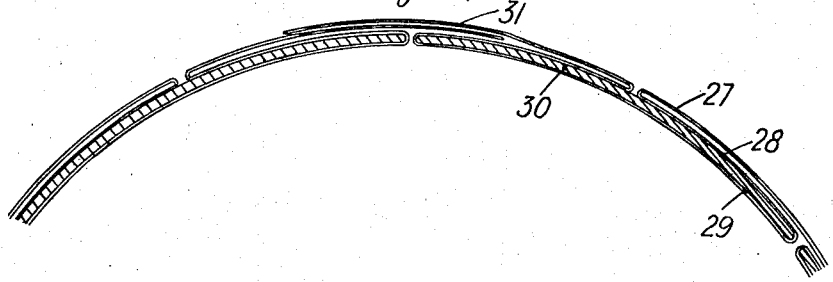
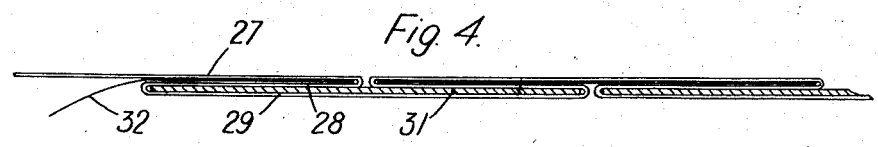
Inventor
W. H. V. CLARKE
By
Attorneys United States Patent Office 2,793,669
Patented May 28, 1957

2,793,669

CONTAINER

William Herbert Victor Clarke, Bournemouth, England, assignor to A. Felix Industries Ltd., London, England, a British company Application February 28, 1955, Serial No. 491,240

Claims priority, application Great Britain March 3, 1954

7 Claims. (Cl. 150—.5)

The present invention relates to containers and more particularly, though not exclusively, to supply containers adapted to be dropped from aircraft in flight and has for its chief object to provide a container which can be roughly handled and even dropped from a height without spilling its contents. A more particular object of the present invention is to provide a supply container which can be dropped from an aircraft, rocket or guided missile in flight without the provision of means such as a parachute for reducing the kinetic energy generated by the container in its fall or devices for absorbing the said kinetic energy, but which will nevertheless reach the ground with its contents intact.

A further object of the present invention is to provide a supply container of relatively light weight and high capacity which can be dropped directly from an aircraft in flight and reach the ground with the contents intact.

According to a feature of the present invention there is provided a container the wall of which is made of an elastic material.

According to a further feature of the present invention also there is provided a container comprising a wall made of a flexible, and preferably elastic, material which is doubled upon itself or pleated, the doubled portions or pleats being cemented together by a cement which adheres said portions or pleats together with a tenacity less than the tensile strength of the material itself.

A further feature of the present invention resides in dividing the interior of a container as set forth in either of the immediately preceding two paragraphs, and adapted to be filled with liquid, into compartments by one or more flexible but inextensible partitions through which the liquid contents of one compartment may pass into the other or other compartments under certain conditions.

The wall of the container may comprise a plurality of layers each of which may be made as hereinbefore defined. Alternatively, one or more of the layers may be made of an elastic material and each other layer may be made of a flexible material doubled or pleated as hereinbefore defined. The layers may be connected together or not as desired.

In one contemplated form a container according to the present invention intended more particularly for the delivery of a liquid such as a fuel to the ground from an aircraft in flight, the container may have a more or less elliptical form and the wall thereof may be made of one or more layers of a strong flexible material such as a fabric, for example nylon, impregnated with a synthetic rubber-like material, each layer being doubled upon itself or pleated, the pleats extending in the direction of the greater axis of the container and being bonded or cemented together by a cement—such as a solution of natural or synthetic rubber or rubber-like material—which causes the doubled portions to adhere to one another with a tenacity which is less than the tensile strength of the material. The single layer or the innermost layer, if more than one is used, is suitably proofed so that it is impermeable to the liquid. Alternatively an additional impermeable lining may be provided either inside the inner layer or between two such layers. Such lining may be made of an artificial rubber or plastic material which need not be very strong and will be pleated or otherwise arranged so that its total volume is at least as great as that enclosed by the layers when the pleats are unfolded. If desired, a partition or liner of a flexible but inextensible and reticulated material—such as a cloth, for instance of glass fibre, or other high strength reticulated material may be provided within the container so as to divide the interior space thereof into two compartments. Such a liner acts as a hydraulic shock absorber since liquid may pass through it from one compartment to the other under certain conditions. If the container is to be used only for carrying finely divided solid material, the partition or liner of inextensible material will not be used and it is not necessary to proof the inner layer or to provide an impermeable lining. A protective covering made of a flexible but tough material, such as tough rubber, woven material or cloth, may if desired be provided as an outer shell over the whole or part of the container to resist localised damage due, for example, to the presence of sharp objects or to tangential motion in contact with the ground or other surface with which the container may come in contact during or at the end of its fall.

One form of the container of this invention is shown in the accompanying drawings, in which:

Figure 2 shows a half cross-section of one of the layers of the wall of the container of Figure 1, Figure 3 shows in section, and to a larger scale, a portion of this layer, and Figure 4 shows how the pleats in this layer are formed and secured together.

Figure 1:
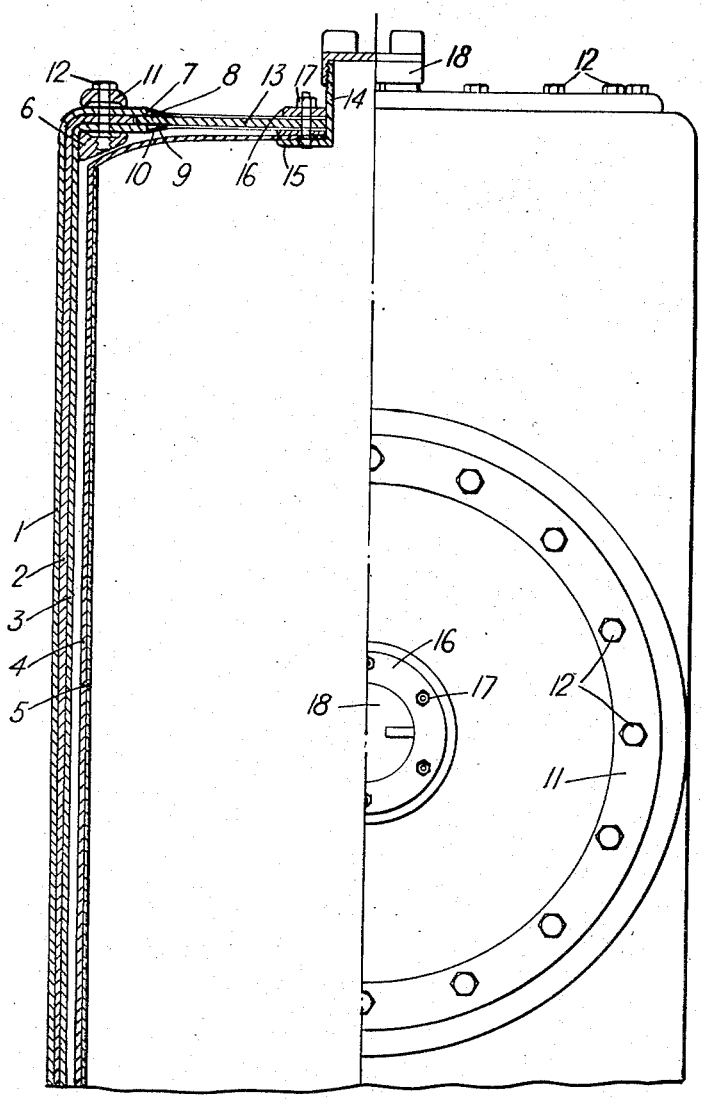
Figure 1 is in part a side elevation and in part a section.
Figure 1:
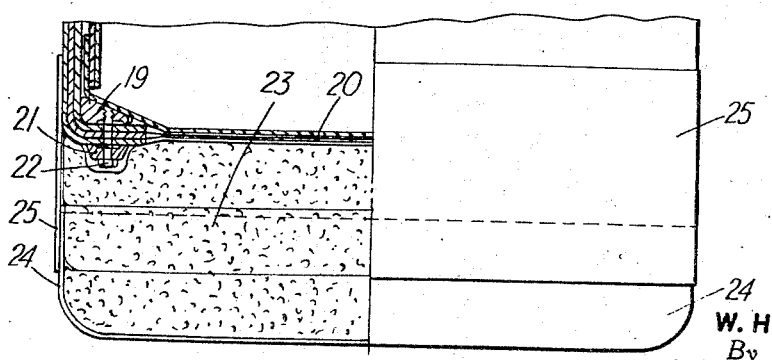

The container shown in Figure 1 is adapted for the transport of liquid and is cylindrical in shape. It may, however, be ellipsoidal, ovoidal, or of a shape determined by aerodynamic practice, but in general a cylindrical shape is preferred for ease in manufacture, and containers of this shape have also been found to be satisfactory in use.

The wall of the container shown in the drawing comprises three superimposed layers 1, 2 and 3, which are each formed of nylon or other strong flexible fabric. In addition there is a lining 4 which is impermeable to the liquid and may be formed of a suitable synthetic rubber-like material, and an inner partition or liner 5 which is formed of an inextensible but flexible fabric such as a glass cloth and which is permeable by the liquid.

As will be explained in greater detail below, the layers 1, 2 and 3 are pleated longitudinally so that when the pleats are opened there may occur a relatively large increase in the circumference of the container. The lining 4 is also pleated or otherwise arranged so that there may occur a corresponding increase in the circumference but the liner 5 is unpleated so that the volume thereof cannot change appreciably.

At the top of the container the layers 1, 2 and 3 are turned inwards over an inner clamping ring 6 and are interleaved with the outer parts of four discs 7 to 10 of glass cloth or other suitable strong and inextensible material, the layers and glass cloth discs being secured together by a suitable cement and clamped between the ring 6 and an outer clamping ring 11 by the bolts 12.

An annular metal plate 13 is arranged between the glass cloth discs 8 and 9 and as shown the layers 1 and 3 are arranged to extend slightly over the faces thereof while the layer 2 abuts against the edge. A filler orifice 14 is secured in the centre of the glass cloth discs 7 to 10 and the metal plate 13, the discs and plate being clamped between a flange 15 and a ring 16 by the bolts 17. The orifice 14 is closed by a screw cap 18. At the bottom of the container the layers 1, 2 and 3 are similarly turned inwardly over the clamping ring 19 and are interleaved with and secured by cement to four discs of glass cloth 20, the join of the layers and the discs again being clamped between the ring 19 and the outer ring 21 by the bolts 22.

In some cases the clamping rings 6, 11 and 19, 21 may be omitted.

The bottom of the container is protected against impact by a pad 23 of sponge rubber or like resilient material which is secured to the container by a cap 24 and a band 25 of flexible material, the band being secured to the cap and to the outer layer 1 of the container by adhesive.

As mentioned above, each of the layers 1, 2 and 3 is pleated. One method of doing this is shown in Figures 2, 3 and 4 although it will be appreciated that other forms of pleating may be used if desired. Each layer is formed from a rectangular strip of fabric which has a width equal to the height of the container plus the length of the turnings at the top and bottom, and a length equal approximately to three times that of the layer. The strip is then folded in such a way as to form a series of box pleats and inverted pleats with the edges of the inverted pleats meeting so that over its whole length the folded strip is in three layers. Of these three layers the middle one and preferably the inner one are secured together by adhesive. The outer ends of the strip are then lapped and secured by adhesive so as to form the strip into a cylinder. A section of part of such a cylinder is shown in Figure 3, the outer, middle and inner layers of the pleats being shown at 27, 28 and 29 respectively, the adhesive joining the layers 28 and 29 being indicated at 30 and the lap join between the ends of the strip being indicated at 31.

Since the height from which the container may be dropped without bursting when it hits the ground is dependent on the resistance to peeling of the parts of the pleats which are stuck together, the importance of a strong bond between these parts will be appreciated. The force required to break the material will of course always be much greater than is required to separate the adhering parts of the pleats.

One method of securing these pleats is shown in Figure 4. As the material is folded to form the layers 27, 28 and 29, a sheet 31 of a suitable artificial rubber or thermoplastic material is inserted between the layers 28 and 29, while a sheet 32 of a material such as cellophane is included between the layers 27 and 28. The pleated material arranged as shown is then subjected to heat and pressure so that the material of the sheet 31 becomes forced into the interstices of the fabric, thus providing a mechanical bond in addition to adhesion between the two layers. The sheet 32 of cellophane on the other hand serves to prevent adhesion between the layers 28 and 29 which otherwise might occur owing to the material 31 penetrating through the layer 28 and into the layer 27. The three layers 1, 2 and 3 which form the wall of the container are each made in this manner and are assembled one within the other.

The impermeable lining 4 for retaining the liquid is not fastened to the layers 1 to 3. It is, however, pleated or otherwise formed so that it can remain in contact with the layer 3 when the pleats in the layers 1 to 3 open without the material of which the lining is formed being unduly stressed. This lining will normally be made of a relatively low strength material.

The inner partition or liner 5 is a plain cylinder formed of a non-extensible reticulated material such as a glass cloth. This liner is permeable to the liquid and acts as a hydraulic resistance to absorb some of the kinetic energy released on impact. When the container hits the ground, its length will tend to decrease and its diameter will tend to increase, in proportion to the extent to which the pleats in the layers 1 to 3 open. The liquid held within the lining 4 will then tend in part to flow outwards through the partition 5 which does not change appreciably in diameter, and the resistance to flow which is imposed by the partition acts to absorb some of the kinetic energy. If the container is not to be used for the transport of liquid, the lining 4 and the partition 5 may be omitted. Furthermore the lining 4 may be omitted if the innermost pleated layer is made of a material which is proofed in such a way as to render it impermeable to the liquid.

The number of pleated layers which may be used to form the wall of the container may be varied according to requirements, for example according to the maximum height from which the container is required to be dropped without bursting, the amount of kinetic energy absorbed being dependent on the force required to unpeel the pleats and the number of layers that become unpleated in succession.

A container according to the present invention may be filled with any flowable material, such as a liquid, sand or flour, or indeed any material in more or less finely divided form. It may also be filled with small articles such as cartridges or the like which are capable of movement with respect to one another, and the size of the filling orifice may be varied according to the primary use of the container.

What I claim is:

1. A liquid container in which the wall is formed at least in part of at least one layer of a pleated flexible material, an inner extensible lining of a material impervious to the liquid, and a liner of a reticulated inextensible material arranged within said inner lining.

2. A liquid container in which the wall is formed of two or more layers of a strong flexible material which over at least part of the wall is pleated, the pleats being secured together by adhesive but so that the strength of the join is less than the tensile strength of the material, an extensible lining within the container of a material impervious to the liquid, and a liner of a reticulated inextensible material within said lining.

3. A supply container comprising a cylindrical housing including an end wall and a side wall, in which said side wall comprises a plurality of shells and each said shell is formed of a sheet of flexible material which is folded upon itself on lines parallel with the axis of the container to form pleats, two of the three superimposed layers of which are secured together by adhesive, the strength of the join being, however, less than the tensile strength of the material.

4. A supply container as claimed in claim 3, including an inner lining of material impervious to liquid and a liner, arranged within said lining, of a non-extensible reticulated material.

5. A supply container comprising a cylindrical housing including a side wall constituted by a plurality of layers of flexible material, which in each layer is folded on lines parallel to the axis of the container to form pleats, end walls each comprising a plurality of layers of flexible material, the layers of said side wall and said end walls being interleaved at their junction and secured together by adhesive.

6. A supply container as claimed in claim 5, including an inner extensible lining of material which is impervious to liquid.

7. A supply container comprising a tubular housing including end walls and a side wall, in which said side wall is formed of a sheet of flexible material two opposite edges of which are joined together to form a tube, the said sheet being folded on lines parallel with the axis of the tube to form a series of pleats and two of three superimposed layers of material constituting each pleat being secured together by adhesive in such a manner that the strength of the joint is less than the tensile strength of the material.

References Cited in the file of this patent

UNITED STATES PATENTS

| | | |
|---|---|---|
| 1,789,699 | Durham | Jan. 20, 1931 |
| 2,127,012 | Spangler et al. | Aug. 16, 1938 |
| 2,404,766 | Hanson et al. | July 23, 1946 |
| 2,439,562 | Cunningham | Apr. 13, 1948 |
| 2,555,564 | Berman | June 5, 1951 |